Figure 1:
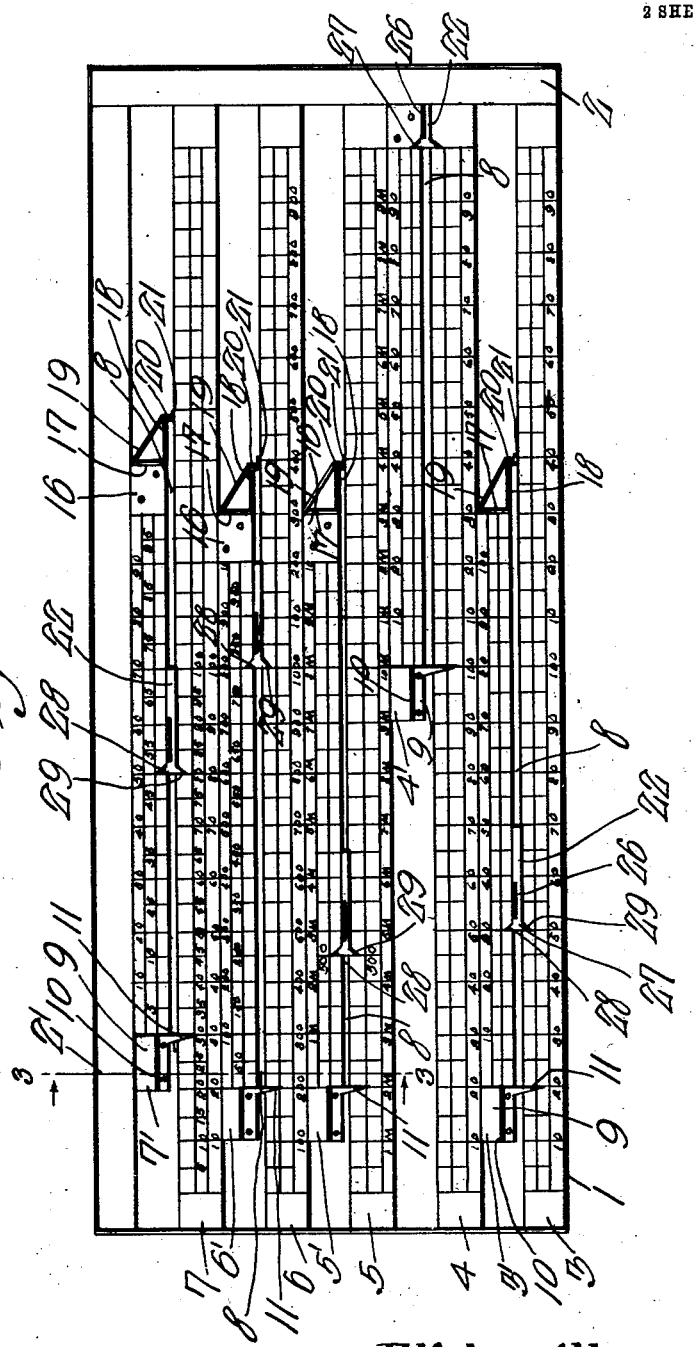

E. ATTAWAY.
MATHEMATICAL COMPUTER AND REGISTER.
APPLICATION FILED JULY 24, 1911.

1,016,245.

Patented Feb. 6, 1912.
2 SHEETS—SHEET 1.

Witnesses

Elisha Attaway
Inventor by C. A. Snow & Co.
Attorneys

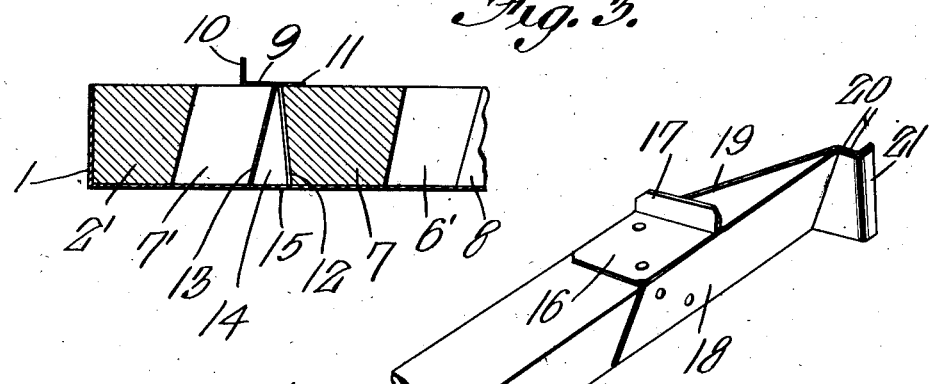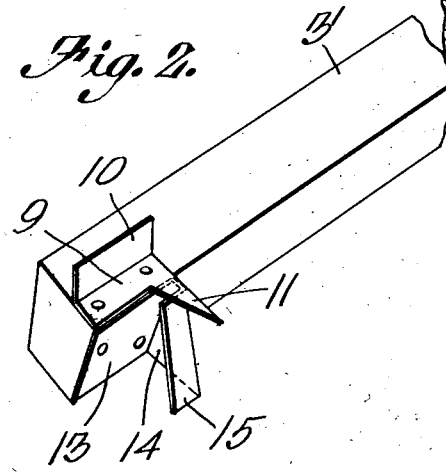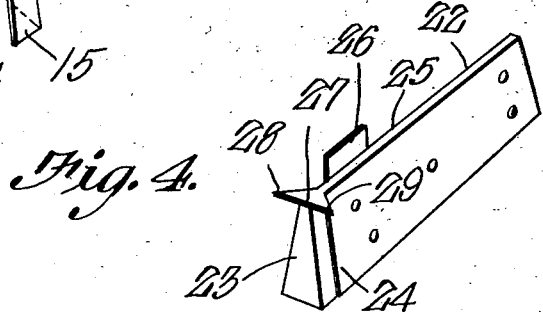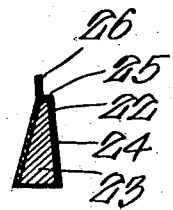

UNITED STATES PATENT OFFICE.

ELISHA ATTAWAY, OF MORROW, LOUISIANA.

MATHEMATICAL COMPUTER AND REGISTER.

1,016,245.      Specification of Letters Patent.      Patented Feb. 6, 1912.

Application filed July 24, 1911. Serial No. 640,184.

*To all whom it may concern:*

Be it known that I, ELISHA ATTAWAY, a citizen of the United States, residing at Morrow, in the parish of St. Landry and State of Louisiana, have invented a new and useful Mathematical Computer and Register, of which the following is a specification.

The present invention relates to improvements in mathematical computers and registers, and the primary object of the invention is the provision of a computing or registering device especially applicable for use in keeping scale registers, or in fact for quickly computing in addition and subtraction, to obtain the gross and net weight in weighing loaded cars and wagons, or in fact for obtaining the sums in addition or the minuends in substraction for any purpose whatsoever.

A further object of the invention is the provision of a rectangular receptacle provided with a series of longitudinally disposed and spaced divided or scaled bars, combined with a series of slidably mounted bars or poises, each one of which is provided with a scale with proper registering markings thereon, combined with a slidably mounted auxiliary poise disposed upon the main sliding poises and so mounted as to have its double arrow head or point register with the scale upon the stationary or main sliding bar to co-act with a pointer carried at the extreme left end of the slidable bar, to indicate the sum or minuend particularly pointed to by the respective pointers.

With the foregoing and other objects in view which will appear as the description proceeds, the invention resides in the arrangement and combination of parts and in the details of construction hereinafter described and claimed, it being understood that changes in the precise embodiment of invention herein disclosed can be made within the scope of what is claimed without departing from the spirit of the invention.

In the drawings—Figure 1 is a top plan view of the complete apparatus, the main poises being in various positions, to demonstrate the use of this invention. Fig. 2 is a perspective view of one of the main poises removed. Fig. 3 is a cross section taken on line 3—3 of Fig. 1. Fig. 4 is a perspective view of one of the auxiliary poises. Fig. 5 is a cross section therethrough.

Referring to the drawings, the numeral 1 designates the metal receptacle provided with four upstanding portions forming a rim to receive the transverse detachable end strip 2 which projects above the rims of the receptacle and holds the respective members within the receptacle, the longitudinally disposed strip 2' being mounted within the receptacle at the upper edge as clearly shown in Figs. 1 and 3.

Disposed rigidly within the receptacle and parallel to each other, are the stationary bars, 3, 4, 5, 6 and 7, whose opposed faces are inclined, so as to provide dovetailed slots therebetween for the movable reception of the respective main sliding poises 3', 4', 5', 6' and 7', the same being in operable relation to the respective stationary scale bars, and all of said bars and poises being provided with scales as shown divided into equal parts, to represent pounds, decimals of pounds, dollars and cents, tons and decimals of tons, or in fact any scale of weights and measures that may be desired.

The main poises are so disposed within the spaces between the stationary bars that the spaces 8 are provided, the purpose of which will presently appear.

Each one of the main poises or bars, such as 3' as clearly shown in Fig. 2, are provided at their left hand ends with the plates 9 having the right angled finger engaging plate or flange 10, and the indicating pointer 11, adapted to overlap the co-acting main bar.

Disposed upon the inner face of the main poise such as 3', and opposite the plate 9 is a plate 13, having the triangular shaped plate 14 formed at the inner end thereof and terminating in the angular flange or guiding arm 15, which is adapted to abut the base 12 of its respective co-acting stationary bar 3 and thereby provide a means to retain the movable poise within the space between the stationary bars of the device. Mounted at the other end of the sliding poise is a plate 16 having the upstanding finger engaging plate or flange 17, so that the said poise may be slid within the space between the main or stationary bars so that the pointer 11 may be stopped at the desired scale.

In order to retain the body and ends of the poise in parallel and within the receptacle between the stationary bars, the straight arm 18 and the curved arm 19 are secured to the extreme end of the poise as 3' and are provided with the double pointed portion 20 terminating in the foot or guide plate 21 which is adapted to engage the base 12 of the stationary bar similar to the flange 15, and thereby retain the sliding poises in relative parallel relation to the stationary bars.

Disposed to slide within the spaces 8 and be locked therein are the auxiliary poises 22, each of one of which consists of the block 23 dove-tail in cross section, and having mounted thereon the metal plate 24 having the upper short portion 25 resting upon the reduced upper edge of the block 23 and provided with the upstanding finger engaging flange 26, and with the double pointed dove-tailed portion 27, having the upper tare rate pointer 28 and the lower gross rate pointer 29.

In order to properly demonstrate the use of the present apparatus, the bar 3 and its sliding poise 3' will be illustrated as in operation. For instance as shown in Fig. 1, the pointer 11 indicates 20 cents while the auxiliary poise indicator point indicates the gross 50 cents, while the tare rate pointer 28 indicates 30, so that the minuend would register 20 from 50 leaving 30, or for addition 20 and 30 equals 50. It will thus be seen that all three of the indications are indicated at once, and that by the manipulation of the main sliding poise 3', so that its pointer 11 will indicate the amount it is desired to add to the tare rate carried by the poise 3', or, if desired, the gross rate carried by the stationary bar 3.

The bar 4 and its sliding poise 4' is shown out of operation.

In the position of the bar 5 and its sliding poise 5', the pointer 11 indicates 2,000, while the auxiliary poise indicates at the tare pointer 28 2,500 which if added to the 2,000 pointed by the pointer 11 shows as indicated by the gross pointer 29, the sum of 4,500. Or if desired to subtract, the 2,000 indicated by the pointer 11 subtracted from the 4,500 indicated by the pointer 29, will equal the tare as demonstrated by the tare pointer 28 of 2,500.

As illustrated by the stationary bar 6 and its sliding poise 6', the pointer 11 indicates 200, for instance dollars, while the tare pointer 28 indicates 800 dollars, the gross pointer 29 indicating 1,000 dollars, so that the 200 indicated by the pointer 11 added to the 800 pointed by the tare pointer 28 will equal the amount pointed to by the pointer 29 or 1,000 dollars. To subtract the 800 from the 1,000, the pointer 11 will indicate the minuend 200, while to subtract the 200 from the 1,000 the pointer 28 will indicate the minuend of 800.

As indicated by the stationary bar 7 and its movable poise 7', the pointer 11 indicates 30 while the pointer 28 of the auxiliary poise indicates 50, which if added to the 30 will indicate as pointed by the pointer 29, the sum of 80. The subtraction that is 30 from 80 will indicate as shown by the pointer 28 the minuend of 50.

From this description it will be noted that the manipulation of this device is very simple and that a person of ordinary intelligence can keep a register or record of the weights, and should it be desired to continue an account or register, it is simply necessary to manipulate the movable poises with relation to the stationary bars and the auxiliary poises, adding and subtracting as desired any of three numbers, giving at an instant, the sum or the minuend, as clearly set forth in the examples heretofore given.

What is claimed is:

1. In a mathematical computer and register, having a receptacle, two stationary bars disposed longitudinally therewithin and providing a space dove-tailed in cross section, the lower of said bars being provided upon its outer face with a graduated scale, a bar of lesser width than the dove-tailed space and of a shorter length than the first two bars slidably mounted within the space therebetween, guiding means carried at the respective ends thereof to retain said sliding bar within the space, a pointer carried by one end thereof projecting above the scale of the lower stationary bar, said sliding bar being provided with equal graduations to the lower bar, and a sliding poise disposed between the sliding bar and lower stationary bar, and provided with oppositely disposed pointers adapted to simultaneously indicate the graduations upon the respective scales of the lower stationary bar and the sliding bar.

2. In a mathematical computer and register, a receptacle, two stationary bars disposed longitudinally therewithin and providing a space dove-tailed in cross section, the lower of said bars being provided upon its outer face with a graduated scale, a bar of lesser width than the dove-tailed space and of a shorter length than the first two bars slidably mounted within the space therebetween, a plate at each end of said sliding bar for engaging the lower stationary bar to retain the sliding bar within the dove-tailed space, said sliding bar being narrower than said space and providing a dove-tailed in cross section space parallel with the sliding bar and between said plates, a pointer carried at one end of the sliding bar to project above the scale of the lower stationary bar, said sliding bar being provided with similar graduations to the lower bar, and a sliding poise dove-tailed in cross section mounted for sliding movement in the reduced dove-tailed space between the sliding bar and lower stationary bar, said sliding poise having at one end oppositely disposed pointers to simultaneously indicate graduations upon the respective scales of the lower stationary bar and the sliding bar.

In testimony that I claim the foregoing as my own, I have hereto affixed my signature in the presence of two witnesses.

ELISHA ATTAWAY.

Witnesses:
W. W. HALEY,
S. L. GIPSON.